Patented Oct. 10, 1922.

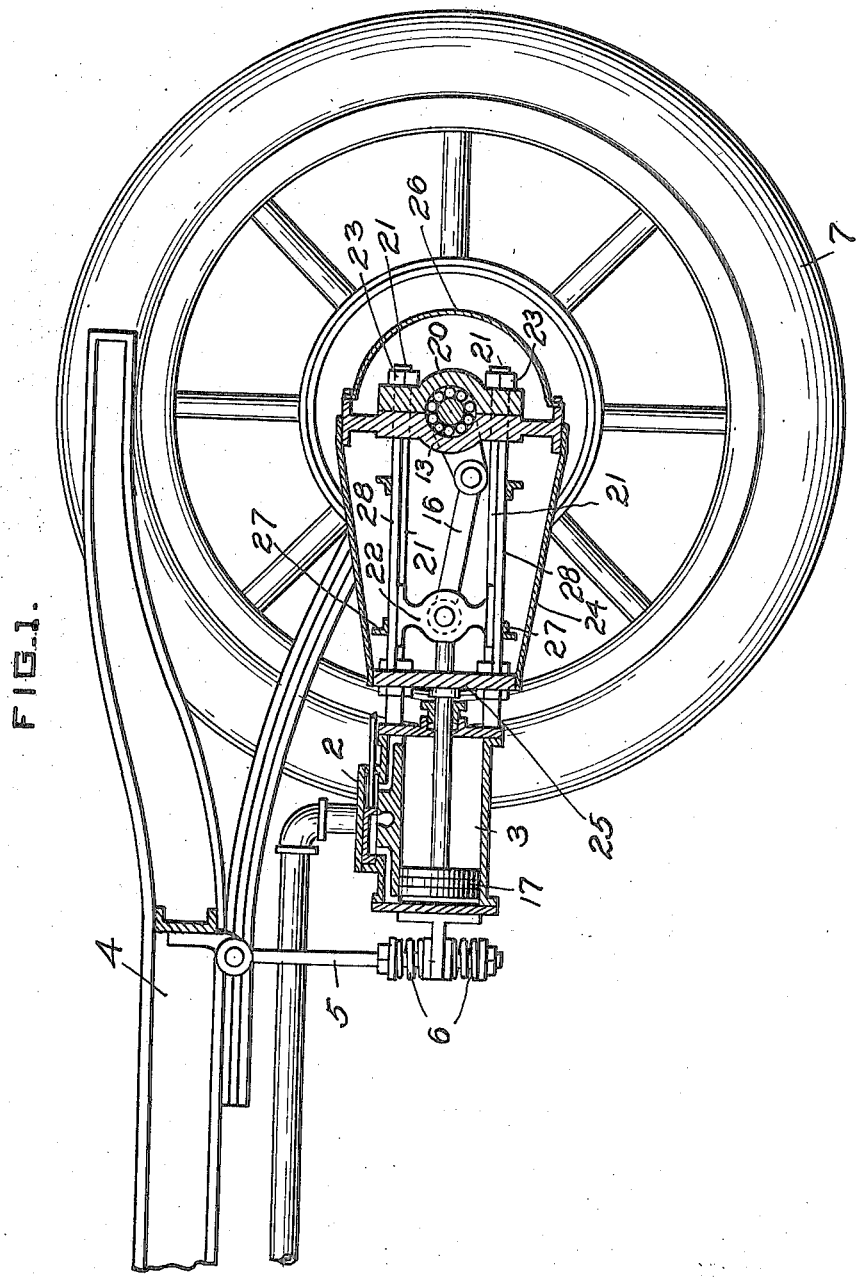

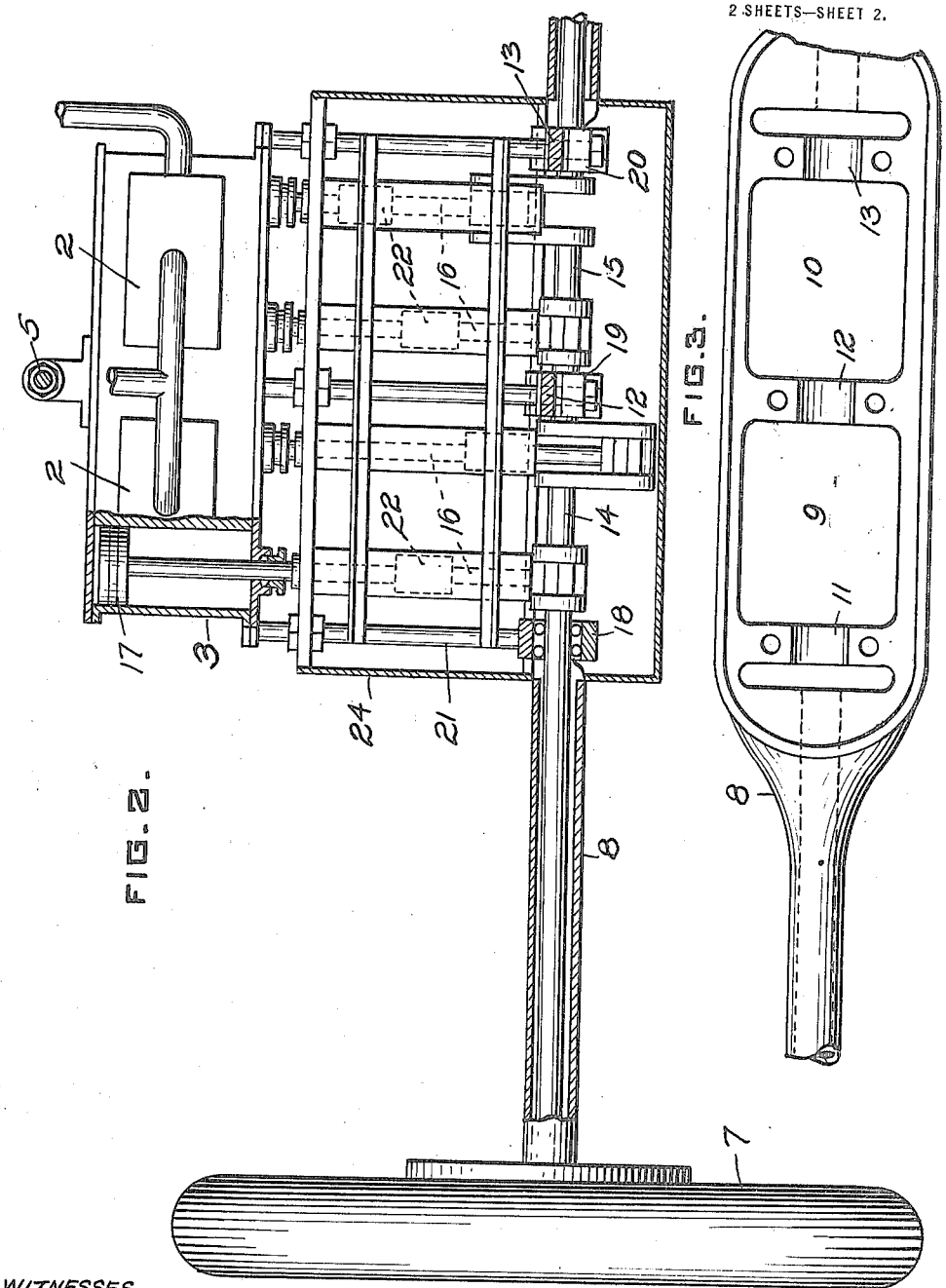

1,431,534

UNITED STATES PATENT OFFICE.

DUNCAN MACDONALD, OF PITTSBURGH, PENNSYLVANIA.

VEHICLE REAR END.

Application filed October 23, 1920. Serial No. 418,922.

*To all whom it may concern:*

Be it known that I, DUNCAN MACDONALD, a citizen of the United States, and a resident of Pittsburgh, in the county of Allegheny and State of Pennsylvania, have made a new and useful Improvement in Vehicle Rear Ends, of which the following is a specification.

My invention relates to motor vehicles and is especially adapted for use in steam-driven vehicles. The invention consists in improvements in the engine mounting, and rear axle construction shown and described in a previous application filed by me which resulted in patent No. 1,314,528, issued September 2, 1919.

An object of my invention is to secure a more rigid and more compact assembly of the engine and rear axle, to provide an axle adapted for this type of driving mechanism and to facilitate access to the interior of the rear end construction.

These objects are attained in the construction illustrated in the accompanying drawings in which Figure 1 is a vertical section through the rear end of a vehicle showing one of the traction wheels and part of the engine; Fig. 2 is a plan of the driving mechanism and a horizontal section through the rear axle and mechanism casing, and Fig. 3 is a detailed elevation of the rear axle.

The motive power of the vehicle illustrated is steam which is generated in a boiler (not shown) and delivered by pipe 1 to a steam chest 2, which overlies the cylinders 3, four in number, preferably cast en bloc and pivotally supported from the vehicle frame 4 by a suspension link 5 which may have a cushioned connection 6 to the cylinder unit.

The vehicle rear wheels 7 are rotatably mounted on the ends of an axle 8 which has a substantially I-shaped central section having portions of its web cut away at 9 and 10 and the adjacent web portions recessed at 11, 12 and 13 to form bearings for a pair of crank-shafts 14 and 15. These crankshafts are driven from the cylinder unit by the connecting rods 16 which are connected at their other ends to the piston rods of pistons 17 working in the cylinders 3 and extend through axle 8 to drivingly engage wheels 7. The cutaway portions 9 and 10 of axle 8 afford room for the rotation of the crank portions of crank-shafts 14 and 15. Bearing caps 18, 19 and 20 co-operate with recesses 11, 12 and 13 to complete the crank-shaft bearings. The opposite ends of rods 21 are screwed into cylinder unit 3 and axle 8 respectively, and space the unit from the axle and co-operate with link 5 to support the engine. By means of angles 27, rods 21 mount ways 28 on which slide the piston cross-heads 22. Rods 21 and bolts 23 removably secure the bearing caps 18, 19 and 20.

A casing 24 extends from axle 8 to a plate 25 adjacent cylinders 3 and, with a supplementary casing 26, completely encloses the moving parts outside of cylinders 3. Casing 26 is easily removed to provide access to the crank-shaft and bearings.

The axle, while of a rigid I-beam section at its weaker parts, is constructed to permit the alignment of the crank-shafts with the central web portion and to form bearings for same.

As pointed out in the above-mentioned patent specification, the necessity of the usual differential gearing is eliminated as the single steam line automatically supplies the pair of cylinders operating each wheel with the necessary steam to displace their respective pistons so as to propel that wheel a certain distance. If one traction wheel meets with greater resistance than the other (as does the inner wheel on a curve) the resistance to the piston movement in the cylinders will result in more steam being diverted to the other cylinders and proportionately increased driven travel of their traction wheel. The absence of a differential mechanism in the rear end contributes largely to the compactness of the mechanism and it enables the rear axle to be lighter and more rigid than otherwise. The weight of the power plant is removed from the housing and transferred to a strong axle which encloses the driving axle. The casing 24 is retained for a cover but is relieved from acting as a load support. The engine is moved nearer to the rear wheels and the whole power plant materially stiffened and this is accomplished at a reduction in cost of material and labor from the design disclosed in the above-mentioned patent.

I claim as my invention:

1. In a motor-driven vehicle, a driving end construction comprising a load-bearing axle having tubular end portions and a vertically webbed intermediate portion provided with apertures, driving wheels rotatably mounted on the ends of said load-bearing axle, and a pair of driving axles operatively connected with said wheels and having their outer end portions housed in the tubular portions of the load-bearing axle while their adjacent portions are provided with cranks for the application of rotative power, clearance for the revolution of said cranks being provided by said apertures.

2. In a motor-driven vehicle, a driving end construction comprising a load-bearing axle having tubular end portions and a vertically webbed intermediate portion provided with apertures, driving wheels rotatably mounted on the ends of said load-bearing axle, a pair of driving axles operatively connected with said wheels and having their outer end portions housed in the tubular portions of said load-bearing axle while their adjacent end portions are provided with cranks for the application of rotative power, clearance for the revolution of said cranks being provided by said apertures, and bearings carried by the intermediate portion of said load bearing axle for the inner end portions of said driving axles.

3. In a motor-driven vehicle, a driving end construction comprising a load-bearing axle having tubular end portions and a vertically webbed intermediate portion offset from the axis of said end portions and provided with apertures, driving wheels rotatably mounted on the ends of said load-bearing axle, a pair of driving axles operatively connected with said wheels and having their outer end portions housed in the tubular portions of said load-bearing axle while their adjacent end portions are provided with cranks for the application of rotative power, clearance for the revolution of said cranks being provided for by said apertures.

4. In a motor-driven vehicle, a driving end construction comprising a load-bearing axle having tubular end portions and a vertically webbed intermediate portion offset from the axis of said end portions and provided with apertures, driving wheels rotatably mounted on the ends of said load-bearing axle, a pair of driving axles operatively connected with said wheels and having their outer end portions housed in the tubular portions of said load-bearing axle while their adjacent end portions are provided with cranks for the application of rotative power, clearance for the revolution of said cranks being provided for by said apertures, and bearings carried by said load-bearing axle for the inner end portions of said driving axles.

5. In motor-vehicle driving mechanism, the combination of a continuous load-bearing axle having tubular ends, driving wheels rotatably mounted on said tubular ends, driving-axles housed in the tubular ends of said load-bearing axle and operatively connected to said driving wheels, the inner adjacent ends of said driving axles being provided with crank portions, a reciprocating engine having one end supported from the frame of the vehicle, a housing mounted directly on the intermediate portion of said load-bearing axle and to which the other end of said engine is attached, and operative connection, contained within said housing, between said engine and the crank portions of said driving-axles.

6. In motor-vehicle driving mechanism, the combination of a continuous load-bearing axle having tubular ends and a vertically webbed intermediate portion provided with apertures, driving wheels rotatably mounted on the tubular ends of said load-bearing axle, driving-axles housed in the tubular ends of said load-bearing axle and operatively connected with said driving wheels, the adjacent ends of said driving axles being provided with crank portions which revolve in said apertures in the load-bearing axle, a reciprocating engine having one end supported from the vehicle frame, a housing secured to the webbed portion of said load-bearing axle and to which the other end of said engine is attached, and operative connection between said engine and the crank portions of said driving-axles, said operative connection being contained in said housing.

7. In motor-vehicle driving mechanism, the combination of a continuous load-bearing axle having tubular ends and a vertically webbed intermediate portion provided with apertures, driving wheels rotatably mounted on the tubular ends of said load-bearing axle, driving-axles housed in the tubular ends of said load-bearing axle and operatively connected with said driving wheels, the adjacent ends of said driving axles being provided with crank portions which revolve in said apertures in the load-bearing axle, a reciprocating engine having one end supported from the vehicle frame, a housing secured to the webbed portion of said load-bearing axle and to which the other end of said engine is attached, operative connection between said engine and the crank portions of said driving-axles, said operative connection being contained in said housing, and a second housing secured to the webbed portion of said driving-axle and inclosing the other ends of said apertures.

In testimony whereof, I have hereunto subscribed my name this 5th day of October, 1920.

DUNCAN MACDONALD.